US009750275B2

(12) United States Patent  
Hayakawa et al.

(10) Patent No.: US 9,750,275 B2  
(45) Date of Patent: Sep. 5, 2017

(54) PACKED BEVERAGE

(71) Applicant: KAO CORPORATION, Chuo-ku (JP)

(72) Inventors: Yoshinobu Hayakawa, Sumida-ku (JP); Shun Sakoda, Sumida-ku (JP)

(73) Assignee: KAO CORPORATION, Chuo-ku (JP)

( * ) Notice: Subject to any disclaimer, the term of this patent is extended or adjusted under 35 U.S.C. 154(b) by 0 days.

(21) Appl. No.: 14/904,344

(22) PCT Filed: Jun. 26, 2014

(86) PCT No.: PCT/JP2014/067006  
§ 371 (c)(1),  
(2) Date: Jan. 11, 2016

(87) PCT Pub. No.: WO2015/005124  
PCT Pub. Date: Jan. 15, 2015

(65) Prior Publication Data  
US 2016/0143340 A1    May 26, 2016

(30) Foreign Application Priority Data

Jul. 12, 2013 (JP) ................................. 2013-146161

(51) Int. Cl.  
*A23L 2/00* (2006.01)  
*A23L 2/66* (2006.01)  
*A23L 2/52* (2006.01)  
*A23L 2/46* (2006.01)  
*A23L 2/60* (2006.01)

(52) U.S. Cl.  
CPC ........ *A23L 2/66* (2013.01); *A23L 2/46* (2013.01); *A23L 2/52* (2013.01); *A23L 2/60* (2013.01); *A23V 2002/00* (2013.01)

(58) Field of Classification Search  
CPC ................. A23L 2/52; A23L 2/46; A23L 2/60  
USPC ............... 426/590, 594, 597, 656, 648, 655  
See application file for complete search history.

(56) References Cited

U.S. PATENT DOCUMENTS

| | | | |
|---|---|---|---|
| 2009/0110774 A1 | 4/2009 | Milici | |
| 2009/0214712 A1 | 8/2009 | Kang et al. | |
| 2011/0135786 A1 | 6/2011 | Milici et al. | |
| 2012/0231119 A1 | 9/2012 | Matsuura et al. | |
| 2014/0127382 A1* | 5/2014 | Kitanaka | A23L 2/52 426/590 |
| 2014/0295040 A1 | 10/2014 | Milici et al. | |
| 2015/0289536 A1 | 10/2015 | Milici et al. | |

FOREIGN PATENT DOCUMENTS

| | | |
|---|---|---|
| CN | 102791140 A | 11/2012 |
| JP | 2002-27957 A | 1/2002 |
| JP | 2004-357539 A | 12/2004 |
| JP | 2008-220215 A | 9/2008 |
| JP | 2012-44918 A | 3/2012 |
| JP | 2013-000073 A | 1/2013 |
| JP | 2013-27347 A | 2/2013 |
| JP | 2013-074802 A | 4/2013 |
| WO | WO 2011/071108 A1 | 6/2011 |

OTHER PUBLICATIONS

"Viscosity of the liquid food", New Food Industry, vol. 23, 1981, 2 pages( with unedited computer generated English translation).  
International Search Report issued Sep. 30, 2014, in PCT/JP2014/067006 filed Jun. 26, 2014.  
"Standard Tables of Food Composition in Japan", Council for Science and Technology, Ministry of Education, Culture, Sports, Science and Technology, Edited by Subdivision on Resources, Fifth revised and enlarged edition, (2005), (3 pages) (with Partial English Translation).  
Ying Qin et al., "Life Guidance of Kidney Disease Patients", China Press Traditional Chinese Medicine, Feb. 2010, (with Partial English Translation), 5 pages.  
Zhonghua Huang et al., "Practical Handbook of Chinese Seasoning Food Technology", China Standard Press, Feb. 1991, (with Partial English Translation), 3 pages.  
Xin Yu, et al., "Process Technology for Traditional Bean Products", *Chemical Industry Press*, First Edition, May 2011, p. 82 with partial English-language translation.

* cited by examiner

*Primary Examiner* — Helen F Heggestad  
(74) *Attorney, Agent, or Firm* — Oblon, McClelland, Maier & Neustadt, L.L.P.

(57) ABSTRACT

Provided is a packaged beverage subjected to heat sterilization, including the following components (A) and (B): (A) 2.5 mass % or more of a protein; and (B) non-polymer catechins, the packaged beverage having: a mass ratio between the component (A) and the component (B), [(B)/(A)], of from 0.02 to 0.1; a viscosity of from 15 to 35 mPa·s; and a pH of 6.3 or more.

20 Claims, No Drawings

… (1)

PACKED BEVERAGE

FIELD OF THE INVENTION

The present invention relates to a packaged beverage.

BACKGROUND OF THE INVENTION

Proteins are major components which constitute connective tissues of animals. In recent years, the proteins have been found to have various physiological effects such as an improvement in athletic performance, recovery from exhaustion, and prevention and amelioration of dysfunction of locomotive organs due to aging or lifestyle habits (locomotive syndrome), and hence have attracted attention as materials for a wide variety of foods and beverages.

Meanwhile, catechins have been reported to have excellent physiological actions such as a suppressive action on an increase in cholesterol and an inhibitory action on amylase activity. Thus, the catechins also have attracted attention as materials for a wide variety of foods and beverages.

In such circumstances, beverages containing proteins and catechins have been developed, and various technologies have been proposed. For example, there have been proposed: a technology for masking bitterness and astringency of gallate-type catechins and unpleasant taste of collagen by incorporating a water-soluble collagen, gallate-type catechins, and a water-soluble soybean polysaccharide at a predetermined quantitative ratio (Patent Document 1); a technology for suppressing grassy smelling derived from soybeans or milk by blending a water-soluble soybean polysaccharide, a stabilizer such as casein sodium, and gallate-type catechins in soymilk or a milk beverage, and controlling a quantitative ratio of the gallate-type catechins and solids of a soybean or a milk to a predetermined one (Patent Document 2); and a technology for suppressing decomposition of the non-polymer catechins due to heat sterilization by blending the non-polymer catechins and a water-soluble protein in a coffee extract solution in predetermined amounts, and controlling the ratio of non-epi-form catechins in the non-polymer catechins and the pH to fall within specific ranges (Patent Document 3) or the like.

CITATION LIST

Patent Document

[Patent Document 1] JP-A-2013-73
[Patent Document 2] JP-A-2013-27347
[Patent Document 3] JP-A-2004-357539

SUMMARY OF THE INVENTION

The present invention provides a packaged beverage subjected to heat sterilization, comprising the following components (A) and (B):
(A) 2.5 mass % or more of a protein; and
(B) non-polymer catechins,
the packaged beverage having: a mass ratio between the component (A) and the component (B), [(B)/(A)], of from 0.02 to 0.1; a viscosity of from 15 to 35 mPa·s; and a pH of 6.3 or more.

The present invention provides a method of retaining a median diameter of colloidal particles in a packaged beverage subjected to heat sterilization, comprising:

blending the following components (A) and (B):
(A) 2.5 mass % or more of a protein; and
(B) non-polymer catechins; and
adjusting a mass ratio between the component (A) and the component (B), [(B)/(A)], to from 0.02 to 0.1, a viscosity to from 15 to 35 mPa·s, and a pH to 6.3 or more.

A protein-containing beverage has a problem in drinkability when the concentration of the protein is increased or when the viscosity of the beverage is increased. That is, when the concentration of a protein in a beverage is increased, the viscosity of the beverage is increased to aggregate protein molecules, resulting in further increasing the viscosity. The resulting beverage has a heavy texture and a sensation of sticking in throat when drunk, which is liable to cause a trouble in continuous ingestion. In addition, the inventors of the present invention found that such tendency becomes additionally remarkable when the beverage is subjected to heat sterilization.

The present invention relates to a packaged beverage subjected to heat sterilization which contains a high concentration of protein and has a certain level of viscosity but which has a smooth texture and a good sensation in throat.

The inventors of the present invention found that a packaged beverage which has a certain level of viscosity but which has a smooth texture and a good sensation in throat, forms a small amount of precipitate, and provides a small change in color tone due to heat sterilization can be obtained by, even in a beverage containing a high concentration of protein and having a certain level of viscosity, blending a specific polyphenol at a predetermined quantitative ratio and controlling the pH to fall within a specific range so that the median diameter of colloidal particles in the beverage can be retained when the beverage is subjected to heat sterilization.

According to the present invention, it is possible to provide the packaged beverage subjected to heat sterilization which contains a high concentration of protein and has a certain level of viscosity but which has a smooth texture and a good sensation in throat, forms a small amount of precipitate, and provides a small change in color tone due to heat sterilization.

The packaged beverage of the present invention contains a protein as a component (A)

The protein as the component (A) contained in the packaged beverage of the present invention may be derived from an animal or a plant, and the origin of the raw material is not particularly limited. Specifically, there may be given, for example, a milk protein, a soybean protein, a rice protein, a corn protein, a wheat protein, an egg protein, gelatin, and collagen. The proteins as the component (A) may each be used alone, or two or more thereof may be used in combination. Of those, the protein as the component (A) is preferably one or two selected from the group consisting of a milk protein and a soybean protein from the viewpoints of texture smoothness and a sensation in throat. In particular, the beverage preferably contains a milk protein from the viewpoints of a viscosity, texture smoothness, and a sensation in throat, and preferably contains a soybean protein from the viewpoints of a decrease in the amount of a precipitate, a change in color tone due to heat sterilization, and retention of the median diameter of colloidal particles in the beverage.

The protein as the component (A) contained in the packaged beverage of the present invention preferably includes a casein protein and a whey protein. The content of the casein protein as a component (F) in the protein as the component (A) is preferably 80 mass % or more, more preferably 83 mass % or more, more preferably 87 mass % or more, even more preferably 90 mass % or more, from the viewpoints of texture smoothness and a sensation in throat. It should be noted that the upper limit of the ratio of the casein protein as the component (F) in the protein as the component (A) is not particularly limited and may be 100 mass %, but is preferably 98 mass %, more preferably 95 mass % from the viewpoints of taste and flavor as a beverage. It should be noted that the ratio of the casein protein as the component (F) in the protein as the component (A) ranges preferably from 80 to 100 mass %, more preferably from 83 to 98 mass %, more preferably from 87 to 98 mass %, even more preferably from 90 to 95 mass %. It should be noted that the casein protein in the protein as the component (A) is quantified in accordance with a method described in Examples below.

The protein as the component (A) to be used in the present invention may be obtained by extraction from an animal or a plant, for example. It should be noted that as an extraction method, a known method may be employed, and conditions for extraction may be appropriately selected depending on the kind of the raw material.

In addition, a commercially available product may be used as the protein for the component (A). An example of the milk protein is Milk Protein Concentrate (PRODIET85) (manufactured by Ingredia), and examples of the soybean protein may include Harmony B200 (manufactured by Nippon Shinyaku Co., Ltd.), HINUTE AM, HINUTE DC6, and HINUTE DH (all of which are manufactured by Fuji Oil Co., Ltd.)

It should be noted that, in the present invention, there may be used a product obtained by fractionation or the like from an extract or a commercially available product of a protein so that the ratio of the casein protein as the component (F) in the protein as the component (A) falls within the above-mentioned range.

The content of the protein as the component (A) in the packaged beverage of the present invention is 2.5 mass % or more, is preferably 3 mass % or more, more preferably 3.5 mass % or more, more preferably 4 mass % or more, more preferably 4.5 mass % or more, even more preferably 5 mass % or more, from the viewpoint of a physiological effect, and is preferably 10 mass % or less, more preferably 9 mass % or less, more preferably 8 mass % or less, more preferably 7 mass % or less, even more preferably 6 mass % or less, from the viewpoints of texture smoothness and a sensation in throat. The content of the protein as the component (A) ranges preferably from 2.5 to 10 mass %, more preferably from 3 to 10 mass %, more preferably from 3.5 to 9 mass %, more preferably from 4 to 8 mass %, more preferably from 4.5 to 7 mass %, even more preferably from 5 to 6 mass %. It should be noted that the protein is quantified in accordance with a method described in Examples below.

The packaged beverage of the present invention contains non-polymer catechins as a component (B). The term "non-polymer catechins" as used herein is a collective term for catechin, gallocatechin, catechin gallate, gallocatechin gallate, epicatechin, epigallocatechin, epicatechin gallate, and epigallocatechin gallate. In the present invention, at least one out of the eight kinds of the non-polymer catechins only needs to be incorporated. It should be noted that the content of the non-polymer catechins is defined based on the total amount of the eight kinds of catechins. The term "gallate forms of the non-polymer catechins" as used herein is a collective term for four kinds of catechins: catechin gallate, gallocatechin gallate, epicatechin gallate, and epigallocatechin gallate, and the term "ratio of gallate forms in the non-polymer catechins" refers to a mass ratio of the four kinds of gallate forms to the eight kinds of non-polymer catechins as the component (B).

In the packaged beverage of the present invention, the mass ratio of the non-polymer catechins as the component (B) to the protein as the component (A), [(B)/(A)], is from 0.02 to 0.10, is preferably 0.025 or more, more preferably 0.03 or more, even more preferably 0.035 or more, and is preferably 0.08 or less, more preferably 0.063 or less, even more preferably 0.06 or less, from the viewpoints of further improving texture smoothness and a sensation in throat. The mass ratio [(B)/(A)] ranges preferably from 0.025 to 0.08, more preferably from 0.03 to 0.063, even more preferably from 0.035 to 0.06. It should be noted that the non-polymer catechins are quantified in accordance with a method described in Examples below.

In addition, the content of the non-polymer catechins as the component (B) in the packaged beverage of the present invention is preferably 0.1 mass % or more, more preferably 0.11 mass % or more, more preferably 0.12 mass % or more, more preferably 0.15 mass % or more, even more preferably 0.2 mass % or more, from the viewpoint of a physiological effect, and is preferably 0.5 mass % or less, more preferably 0.45 mass % or less, more preferably 0.4 mass % or less, more preferably 0.35 mass % or less, even more preferably 0.32 mass % or less, from the viewpoint of a sensation in throat. The content of the non-polymer catechins as the component (B) ranges preferably from 0.1 to 0.5 mass %, more preferably from 0.11 to 0.45 mass %, more preferably from 0.12 to 0.4 mass %, more preferably from 0.15 to 0.35 mass %, even more preferably from 0.2 to 0.32 mass %.

The ratio of gallate forms in the non-polymer catechins as the component (3) in the packaged beverage of the present invention is preferably 10 mass % or more and less than 50 mass %, more preferably from 15 to 47 mass %, even more preferably from 20 to 45 mass % from the viewpoint of a balance of taste and flavor.

The packaged beverage of the present invention may further contain a thickener as a component (C)

Examples of the thickener as the component (C) may include alginic acid, agar, carrageenan, fucoidan, dextrin, maltodextrin, pectin, locust bean gum, xanthan gum, gum tragacanth, gellan gum, guar gum, carboxymethylcellulose, hydroxyethylcellulose, or salts thereof or the like. One of the thickeners as the component (C) may be used alone, or two or more thereof may be used in combination. Of those, one or two or more selected from the group consisting of carrageenan, xanthan gum, guar gum, dextrin, and maltodextrin are preferred from the viewpoints of texture smoothness and a sensation in throat. In particular, maltodextrin is preferred, and maltodextrin having a dextrose equivalent of from 3 to 20 is more preferred, from the viewpoints of texture smoothness and a sensation in throat.

The mass ratio of the thickener as the component (C) to the protein as the component (A) in the packaged beverage of the present invention, [(C)/(A)], is preferably 0.01 or more, more preferably 0.04 or more, more preferably 1.3 or more, even more preferably 2 or more, and is preferably 5 or less, more preferably 4 or less, even more preferably 3 or less, from the viewpoints of texture smoothness and a sensation in throat. The mass ratio [(C)/(A)] ranges preferably from 0.01 to 5, more preferably from 0.04 to 4, more preferably from 1.3 to 4, even more preferably from 2 to 3.

The content of the thickener as the component (C) in the packaged beverage of the present invention is preferably 0.2 mass % or more, more preferably 1 mass % or more, more preferably 2 mass % or more, even more preferably 4 mass % or more, from the viewpoints of texture smoothness and a sensation in throat, and is preferably 20 mass % or less, more preferably 14 mass % or less, more preferably 12 mass % or less, even more preferably 8 mass % or less, from the viewpoint of a sensation in throat. The content of the thickener as the component (C) ranges preferably from 0.2 to 20 mass %, more preferably from 1 to 14 mass %, more preferably from 2 to 12 mass %, even more preferably from 4 to 8 mass %.

The packaged beverage of the present invention may further contain a sweetener as a component (D).

Examples of the sweetener as the component (D) include a carbohydrate sweetener and a high-intensity sweetener, and one or two or more thereof may be appropriately selected depending on preference.

Examples of the carbohydrate sweetener may include: monosaccharides, such as fructose, glucose, tagatose, and arabinose; disaccharides, such as lactose, trehalose, maltose, and sucrose; high-fructose corn syrups, such as glucofructose syrup and fructoglucose syrup; and sugar alcohols, such as erythritol, xylitol, and maltitol. Examples of the high-intensity sweetener may include aspartame, sucralose, stevia, thaumatin, glycyrrhizin, saccharin, and acesulfame K or the like.

The content of the sweetener as the component (D) in the packaged beverage of the present invention may be appropriately set depending on the kind of the sweetener. When the sweetener as the component (D) is a carbohydrate sweetener, the content of the sweetener is preferably from 0.01 to 15 mass %, more preferably from 0.05 to 12 mass %, even more preferably from 0.1 to 10 mass %. In addition, when the sweetener as the component (D) is a high-intensity sweetener, the content of the sweetener is preferably from 0.0001 to 5 mass %, more preferably from 0.0001 to 3 mass %, even more preferably from 0.0001 to 1 mass %.

The packaged beverage of the present invention may further contain caffeine as a component (E). The caffeine as the component (E) may be derived from a raw material or may be one which further added to the beverage. The content of the caffeine as the component (E) in the packaged beverage of the present invention, in terms of a mass ratio of the caffeine as the component (E) to the non-polymer catechins as the component (B), [(E)/(B)], is preferably 0.03 or more, more preferably 0.04 or more, even more preferably 0.045 or more, from the viewpoint of texture smoothness, and is preferably 0.3 or less, more preferably 0.08 or less, more preferably 0.075 or less, even more preferably 0.07 or less, from the viewpoint of a balance of taste and flavor. The mass ratio [(E)/(B)] ranges preferably from 0.03 to 0.3, more preferably from 0.03 to 0.08, more preferably from 0.04 to 0.075, even more preferably from 0.045 to 0.07. It should be noted that the caffeine is quantified in accordance with a method described in Examples below.

The packaged beverage of the present invention contains water, and water plays an important role in providing a texture and a sensation in throat when drunk. When the amount of water in the beverage is too small, the beverage has a heavy texture and a sensation of sticking in throat, while when the amount of water in the beverage is too large, the beverage has a light texture and is insufficient in body. From such viewpoints, the content of water (amount of water) in the packaged beverage of the present invention preferably 60 mass % or more, more preferably 65 mass % or more, even more preferably 70 mass % or more, and is preferably 95 mass % or less, more preferably 90 mass % or less, even more preferably 85 mass % or less. The content of water in the packaged beverage of the present invention ranges preferably from 60 to 95 mass %, more preferably from 65 to 90 mass %, even more preferably from 70 to 85 mass %.

The packaged beverage of the present invention has a viscosity (25° C.) of from 15 to 35 mPa·s but contains colloidal particles having a specific median diameter. Thus, the beverage has a certain level of viscosity but has a smooth texture and a good sensation in throat. In such situation, the viscosity of the packaged beverage of the present invention is preferably 16 mPa·s or more, more preferably 17 mPa·s or more, even more preferably 18 mPa·s or more, from the viewpoint of imparting body, and is preferably 33 mPa·s or less, more preferably 30 mPa·s or less, even more preferably 27 mPa·s or less, from the viewpoint of further improving a sensation in throat. The viscosity of the packaged beverage ranges preferably from 16 to 33 mPa·s, more preferably from 17 to 30 mPa·s, even more preferably from 18 to 27 mPa·s. It should be noted that the viscosity is measured in accordance with a method described in Examples below.

In the packaged beverage of the present invention, the median diameter of colloidal particles in the beverage is preferably 0.5 µm or more, more preferably 0.8 µm or more, even more preferably 1.0 µm or more, and is preferably 2.4 µm or less, more preferably 2.2 µm or less, even more preferably 2.0 µm or less, from the viewpoints of texture smoothness and a sensation in throat. The median diameter ranges preferably from 0.5 to 2.4 µm, more preferably from 0.8 to 2.2 µm, even more preferably from 1.0 to 2.0 µm. The term "median diameter" as used herein refers to a particle diameter corresponding to 50% ($d_{50}$) in a cumulative particle size distribution curve on a volume basis measured using a laser diffraction particle size distribution measuring apparatus. A specific measurement method is in accordance with a method described in Examples below. It should be noted that examples of the colloidal particles may include protein molecules derived from a raw material or aggregates thereof, or complexes thereof with components in a beverage, such as the non-polymer catechins, a thickener, a sweetener, and caffeine.

The packaged beverage of the present invention may be produced as a milk beverage or a soymilk beverage depending on the origin of the protein. For example, when the beverage contains a milk protein as the protein as the component (A), the beverage may be produced as a milk beverage, while when the beverage contains a soybean protein, the beverage may be produced as a soymilk beverage.

The packaged beverage of the present invention may further contain additives such as acidulants, pH adjusters, flavors, vitamins, minerals, antioxidants, various esters, pigments, emulsifiers, preservatives, and quality stabilizers, if necessary, alone or in combination of two or more of the additives. It should be noted that the content of each additive may be appropriately set to the extent that the object of the present invention is not impaired.

The packaged beverage of the present invention has a pH (25° C.) of 6.3 or more. The pH is preferably 6.4 or more, more preferably 6.5 or more, more preferably 6.6 or more, even more preferably 6.7 or more, from the viewpoints of retaining the median diameter of colloidal particles in the beverage and further improving texture smoothness and a sensation in throat, and is preferably 7.5 or less, more preferably 7 or less, even more preferably 6.9 or less, from the viewpoint of suppressing degradation of a protein. The pH (20° C.) ranges preferably from 6.3 to 7.5, more preferably from 6.4 to 7.5, more preferably from 6.5 to 7, more preferably from 6.6 to 7, even more preferably from 6.7 to 6.9.

As a container which may be used for the packaged beverage of the present invention, there may be given conventional packages, such as a molded container mainly formed of polyethylene terephthalate (so-called PET bottle), a metal can, a paper container composited with a metal foil or a plastic film, or a bottle.

The packaged beverage of the present invention is subjected to heat sterilization, and a sterilization method is not particularly limited as long as the sterilization is performed under sterilization conditions specified by an applicable regulation (Food Sanitation Act in Japan). Examples of the method may include a retort sterilization method, a high-temperature short-time sterilization method (HTST method), and an ultrahigh-temperature sterilization method (UHT method) or the like. The sterilization in the retort sterilization method is preferably performed at from 121 to 129° C. for 4 minutes to 30 minutes, for example. In addition, the heat sterilization method may be appropriately selected depending on the kind of the container for the packaged beverage. For example, when a container filled with a beverage can be subjected to heat sterilization as it is, like a metal can or a multilayer plastic container, retort sterilization may be applied. On the other hand, when a container such as a PET bottle or a paper container, which cannot be subjected to retort sterilization, is used, there may be employed: aseptic filling, which involves subjecting a beverage to heat sterilization in advance by a method such as UHT sterilization under the same sterilization conditions as above and filling the beverage into a container having been subjected to sterilization treatment in an aseptic environment, or hot-pack filling or the like.

The packaged beverage of the present invention contains a high concentration of protein but can have characteristics of: a suppressed change in median diameter of colloidal particles in the beverage between before and after heat sterilization; a suppressed change in color tone of the beverage; and a small amount of precipitate formed. For example, a variation (Δd), which is determined from a difference between the median diameter of colloidal particles in a beverage before heat sterilization and the median diameter of colloidal particles in a beverage after heat sterilization at 127° C. for 11 minutes, is preferably 3 μm or less, more preferably 2 μm or less, more preferably 1.5 μm or less, even more preferably 1.2 μm or less. It should be noted that the median diameter of colloidal particles in a beverage is measured in accordance with a method described in Examples below.

In addition, a change (ΔE) in color tone, which is determined from a difference between the L* value of a beverage before heat sterilization and the L* value of a beverage after heat sterilization at 127° C. for 11 minutes, is preferably 30 or less, more preferably 22 or less, more preferably 19 or less, even more preferably 18 or less. The term "L* value" as used herein refers to a brightness in an L*a*b* color system, and the L* value is measured in accordance with a method described in Examples below.

Further, when 50 g of the packaged beverage subjected to heat sterilization of the present invention is centrifuged at 20° C. and 6,000 rpm for 10 minutes and then measured for the mass of a precipitate, the ratio of the precipitate to the beverage is preferably 5 mass % or less, more preferably 4.9 mass % or less, even more preferably 3.8 mass % or less. It should be noted that the amount of the precipitate is measured in accordance with a method described in Examples below.

The packaged beverage may be produced by, for example, blending a protein as the component (A), a tea extract, and if necessary, at least one selected from the group consisting of a thickener as the component (C), a sweetener as the component (D), and an additive, and then subjecting the mixture to heat sterilization and filling the resultant into a container, or filling the mixture into a container and subjecting the resultant to heat sterilization.

An example of the tea extract to be used for production of the packaged beverage of the present invention is an extract obtained from leaves of tea selected from the group consisting of unfermented tea, semi-fermented tea, and fermented tea with hot water or a water-soluble organic solvent through kneader extraction or column extraction or the like. Of those, an extract of unfermented tea is preferred, and a green tea extract is more preferred, from the viewpoint of the content of the non-polymer catechins. In addition, a concentrate obtained by removing part of a solvent from a tea extract to increase the concentration of the non-polymer catechins may be used. The tea extract may have various forms such as a solid, an aqueous solution, and a slurry. A commercially available product may be used as the tea extract, and examples thereof may include green tea extracts such as "POLYPHENON" and "Tea Extract POL-JM" manufactured by Mitsui Norin Co., Ltd., "TEAFURAN" manufactured by ITO EN, LTD., and "SUNPHENON" manufactured by Taiyo Kagaku Co., Ltd.

In addition, as the tea extract, a purified tea extract obtained by purifying a tea extract or a concentrate thereof so as to contain the non-polymer catechins at a higher purity may be used. As a purification method, there may be given, for example, any one of the following methods (i) to (iii) or a combination of two or more thereof.

(i) A method of involving suspending a tea extract in water, a water-soluble organic solvent (for example, ethanol), or a mixture of water and a water-soluble organic solvent (hereinafter referred to as "organic solvent aqueous solution"), removing the resultant precipitate, and distilling off the solvent (for example, JP-A-2004-147508 and JP-A-2004-149416)

(ii) A method involving bringing a tea extract into contact with at least one of adsorbent selected from the group consisting of activated carbon, acid clay, and activated clay (for example, JP-A-2007-282568))

(iii) A method involving adsorbing a tea extract to a synthetic adsorbent, bringing an organic solvent aqueous solution or a basic aqueous solution (for example, an aqueous solution of sodium hydroxide) into contact with the synthetic adsorbent to desorb the non-polymer catechins, and if necessary, bringing the resultant desorbed solution into contact with activated carbon (for example, JP-A-2006-160656 and JP-A-2008-079609).

In the methods (i) to (iii) above, the tea extract may be subjected to tannase treatment before use. The term "tannase treatment" as used herein refers to treatment for bringing a tea extract into contact with an enzyme having a tannase activity. The treatment can adjust the ratio of gallate forms in the non-polymer catechins. It should be noted that as a specific operation method of the tannase treatment, a known method may be employed, and an example thereof is a method described in JP-A-2004-321105.

Next, the method of retaining a median diameter of colloidal particles in a packaged beverage subjected to heat sterilization (hereinafter sometimes referred to as "retaining method") is described.

The method of retaining a median diameter of colloidal particles of the present invention involves blending the protein as the component (A) and the non-polymer catechins as the component (B) and adjusting the content of the component (A) to 2.5 mass % or more, the mass ratio between the component (A) and the component (B), [(B)/(A)], to from 0.02 to 0.1, the viscosity to from 15 to 35 mPa·s, and the pH to 6.3 or more. The preferred embodiment regarding to the content of the protein as the component (A) and the kind thereof, the content of the non-polymer catechins as the component (B), the mass ratio [(B)/(A)], the viscosity, and the pH is as described above.

In the retaining method of the present invention, the thickener as the component (C) may be further blended from the viewpoint of further retaining the median diameter. The preferred embodiment of the kind of the thickener as the component (C) and the amount of the thickener to be blended is as described above.

The present invention further discloses the following packaged beverage subjected to heat sterilization and method of retaining a median diameter of colloidal particles in a packaged beverage subjected to heat sterilization regarding the embodiments described above.

<1-1>
A packaged beverage subjected to heat sterilization, comprising the following components (A) and (B):
(A) 2.5 mass % or more of a protein; and
(B) the non-polymer catechins,
the packaged beverage having: a mass ratio between the component (A) and the component (B), [(B)/(A)], of from 0.02 to 0.1; a viscosity of from 15 to 35 mPa·s; and a pH of 6.3 or more.

<1-2>
The packaged beverage according to the above-mentioned item <1-1>, wherein the protein as the component (A) is preferably derived from an animal or a plant.

<1-3>
The packaged beverage according to the above-mentioned item <1-1> or <1-2>, wherein the protein as the component (A) is preferably at least one selected from the group consisting of a milk protein, a soybean protein, a rice protein, a corn protein, a wheat protein, an egg protein, gelatin, and collagen, more preferably at least one selected from the group consisting of a milk protein and a soybean protein.

<1-4>
The packaged beverage according to any one of the above-mentioned items <1-1> to <1-3>, wherein the protein as the component (A) comprises a casein protein and a whey protein.

<1-5>
The packaged beverage according to any one of the above-mentioned items <1-1> to <1-4>, wherein the content of the protein as the component (A) in the packaged beverage is preferably 2.5 mass % or more, more preferably 3 mass % or more, more preferably 3.5 mass % or more, more preferably 4 mass % or more, more preferably 4.5 mass % or more, even more preferably 5 mass % or more, and is preferably 10 mass % or less, more preferably 9 mass % or less, more preferably 8 mass % or less, more preferably 7 mass % or less, even more preferably 6 mass % or less.

<1-6>
The packaged beverage according to any one of the above-mentioned items <1-1> to <1-5>, wherein the content of the protein as the component (A) in the packaged beverage is preferably from 2.5 to 10 mass %, more preferably from 3 to 10 mass %, more preferably from 3.5 to 9 mass-6, more preferably from 4 to 8 mass %, more preferably from 4.5 to 7 mass %, even more preferably from 5 to 6 mass %.

<1-7>
The packaged beverage according to any one of the above-mentioned items <1-1> to <1-6>, wherein the non-polymer catechins as the component (B) is preferably at least one selected from the group consisting of catechin, gallocatechin, catechin gallate, gallocatechin gallate, epicatechin, epigallocatechin, epicatechin gallate, and epigallocatechin gallate.

<1-8>
The packaged beverage according to any one of the above-mentioned items <1-1> to <1-7>, wherein the mass ratio [(B)/(A)] is preferably 0.025 or more, more preferably 0.03 or more, even more preferably 0.035 or more, and is preferably 0.08 or less, more preferably 0.063 or less, even more preferably 0.06 or less.

<1-9>
The packaged beverage according to any one of the above-mentioned items <1-1> to <1-8>, wherein the mass ratio [(B)/(A)] is preferably from 0.025 to 0.08, more preferably from 0.03 to 0.063, even more preferably from 0.035 to 0.06.

<1-10>
The packaged beverage according to any one of the above-mentioned items <1-1> to <1-9>, wherein the content of the non-polymer catechins as the component (B) in the packaged beverage is preferably 0.1 mass % or more, more preferably 0.11 mass % or more, more preferably 0.12 mass % or more, more preferably 0.15 mass % or more, even more preferably 0.2 mass % or more, and is preferably 0.5 mass % or less, more preferably 045 mass % or less, more preferably 0.4 mass % or less, more preferably 0.35 mass % or less, even more preferably 0.32 mass % or less.

<1-11>
The packaged beverage according to any one of the above-mentioned items <1-1> to <1-10>, wherein the content of the non-polymer catechins as the component (B) in the packaged beverage is preferably from 0.1 to 0.5 mass %, more preferably from 0.11 to 0.45 mass %, more preferably from 0.12 to 0.4 mass %, more preferably from 0.15 to 0.35 mass-%, even more preferably from 0.2 to 0.32 mass %.

<1-12>
The packaged beverage according to any one of the above-mentioned items <1-1> to <1-11>, wherein the ratio of gallate forms in the non-polymer catechins as the component (B) is preferably 10 mass % or more and less than 50 mass %, more preferably from 15 to 47 mass %, even more preferably from 20 to 45 mass %.

<1-13>
The packaged beverage according to any one of the above-mentioned items <1-1> to <1-12>, preferably further comprising a thickener as a component (C).

<1-14>
The packaged beverage according to the above-mentioned item <1-13>, wherein the thickener as the component (C) is preferably one or two or more selected from the group consisting of components derived from algae, polysaccharides, and cellulose, more preferably one or two or more selected from the group consisting of alginic acid, agar, carrageenan, fucoidan, dextrin, maltodextrin, pectin, locust bean gum, xanthan gum, tragacanth gum, gellan gum, guar gum, carboxymethylcellulose, hydroxyethylcellulose, and salts thereof, more preferably one or two or more selected from the group consisting of carrageenan, xanthan gum, guar gum, dextrin, and maltodextrin, more preferably maltodextrin, even more preferably maltodextrin having a dextrose equivalent of from 3 to 20.

<1-15>

The packaged beverage according to the above-mentioned item <1-13> or <1-14>, wherein the mass ratio of the thickener as the component (C) to the protein as the component (A), [(C)/(A)], is preferably 0.01 or more, more preferably 0.04 or more, more preferably 1.3 or more, even more preferably 2 or more, and is preferably 5 or less, more preferably 4 or less, even more preferably 3 or less.

<1-16>

The packaged beverage according to any one of the above-mentioned items <1-13> to <1-15>, wherein the mass ratio of the thickener as the component (C) to the protein as the component (A), [(C)/(A)], is preferably from 0.01 to 5, more preferably from 0.04 to 4, more preferably from 1.3 to 4, even more preferably from 2 to 3.

<1-17>

The packaged beverage according to any one of the above-mentioned items <1-13> to <1-16>, wherein the content of the thickener as the component (C) in the packaged beverage is preferably 0.2 mass % or more, more preferably 1 mass % or more, more preferably 2 mass % or more, even more preferably 4 mass % or more, and is preferably 20 mass % or less, more preferably 14 mass % or less, more preferably 12 mass % or less, even more preferably 8 mass % or less.

<1-18>

The packaged beverage according to any one of the above-mentioned items <1-13> to <1-17>, wherein the content of the thickener as the component (C) in the packaged beverage is preferably from 0.2 to 20 mass %, more preferably from 1 to 14 mass %, more preferably from 2 to 12 mass %, even more preferably from 4 to 8 mass %.

<1-19>

The packaged beverage according to any one of the above-mentioned items <1-1> to <1-18>, preferably further comprising a sweetener as a component (D).

<1-20>

The packaged beverage according to the above-mentioned item <1-19>, wherein the sweetener as the component (D) is preferably at least one selected from the group consisting of a carbohydrate sweetener and a high-intensity sweetener, more preferably a carbohydrate sweetener.

<1-21>

The packaged beverage according to the above-mentioned item <1-20>, wherein the carbohydrate sweetener is preferably at least one selected from the group consisting of monosaccharides (for example, fructose, glucose, tagatose, and arabinose), disaccharides (for example, lactose, trehalose, maltose, and sucrose), high-fructose corn syrups (for example, glucofructose syrup and fructoglucose syrup), and sugar alcohols (for example, erythritol, xylitol, and maltitol), and the high-intensity sweetener preferably at least one selected from the group consisting of aspartame, sucralose, stevia, thaumatin, glycyrrhizin, saccharin, and acesulfame K.

<1-22>

The packaged beverage according to the above-mentioned item <1-20> or <1-21>, wherein, when the sweetener as the component (D) is a carbohydrate sweetener, the content of the carbohydrate sweetener in the packaged beverage is preferably from 0.01 to 15 mass %, more preferably from 0.05 to 12 mass %, even more preferably from 0.1 to 10 mass %, and when the sweetener as the component (D) is a high-intensity sweetener, the content of the high-intensity sweetener in the packaged beverage is preferably from 0.0001 to 5 mass %, more preferably from 0.0001 to 3 mass %, even more preferably from 0.0001 to 1 mass %.

<1-23>

The packaged beverage according to any one of the above-mentioned items <1-1> to <1-22>, preferably further comprising caffeine as a component (E).

<1-24>

The packaged beverage according to the above-mentioned item <1-23>, wherein the content of the caffeine as the component (E), in terms of a mass ratio of the caffeine as the component (E) to the non-polymer catechins as the component (B), [(E)/(B)], is preferably 0.03 or more, more preferably 0.04 or more, even more preferably 0.045 or more, and is preferably 0.3 or less, more preferably 0.08 or less, more preferably 0.075 or less, even more preferably 0.07 or less.

<1-25>

The packaged beverage according to the above-mentioned item <1-23> or <1-24>, wherein the content of the caffeine as the component (E), in terms of a mass ratio of the caffeine as the component (E) to the non-polymer catechins as the component (B), [(E)/(B)], preferably from 0.03 to 0.3, more preferably from 0.03 to 0.08, even more preferably from 0.04 to 0.075, even more preferably from 0.045 to 0.07.

<1-26>

The packaged beverage according to any one of the above-mentioned items <1-1> to <1-25>, wherein the content of water in the packaged beverage is preferably 60 mass % or more, more preferably 65 mass % or more, even more preferably 70 mass % or more, and is preferably 95 mass % or less, more preferably 90 mass % or less, even more preferably 85 mass % or less.

<1-27>

The packaged beverage according to any one of the above-mentioned items <1-1> to <1-26>, wherein the content of water in the packaged beverage is preferably from 60 to 95 mass %, more preferably from 65 to 90 mass %, even more preferably from 70 to 85 mass %.

<1-28>

The packaged beverage according to any one of the above-mentioned items <1-1> to <1-27>, wherein the packaged beverage has a viscosity (25° C.) of preferably 16 mPa·s or more, more preferably 17 mPa·s or more, even more preferably 18 mPa·s or more, and is preferably 33 mPa·s or less, more preferably 30 mPa·s or less, even more preferably 27 mPa·s or less.

<1-29>

The packaged beverage according to any one of the above-mentioned items <1-1> to <1-28>, wherein the packaged beverage has a viscosity (25° C.) of preferably from 16 to 33 mPa·s, more preferably from 17 to 30 mPa·s, even more preferably from 18 to 27 mPa·s.

<1-30>

The packaged beverage according to any one of the above-mentioned items <1-1> to <1-29>, wherein the median diameter of colloidal particles in the packaged beverage is 0.5 µm or more, more preferably 0.8 µm or more, even more preferably 1.0 µm or more, and is preferably 2.4 µm or less, more preferably 2.2 µm or less, even more preferably 2.0 µm or less.

<1-31>
The packaged beverage according to any one of the above-mentioned items <1-1> to <1-30>, wherein the median diameter of colloidal particles in the packaged beverage is from 0.5 to 2.4 µm, more preferably from 0.8 to 2.2 µm, even more preferably from 1.0 to 2.0 µm.

<1-32>
The packaged beverage according to any one of the above-mentioned items <1-1> to <1-31>, wherein the protein as the component (A) preferably comprises a milk protein.

<1-33>
The packaged beverage according to the above-mentioned item <1-32>, wherein the milk protein comprises preferably 80 mass % or more, more preferably 83 mass % or more, more preferably 87 mass % or more, even more preferably 90 mass % or more, and preferably 100 mass % or less, more preferably 98 mass less, even more preferably 95 masse or less of a casein protein as a component (F).

<1-34>
The packaged beverage according to the above-mentioned item <1-32> or <1-33>, wherein the milk protein comprises preferably 80 to 100 mass %, more preferably 83 to 98 mass %, more preferably 87 to 98 mass %, even more preferably 90 to 95 mass % of a casein protein as a component (F).

<1-35>
The packaged beverage according to any one of the above-mentioned items <1-32> to <1-34>, wherein the packaged beverage is preferably a packaged milk beverage.

<1-36>
The packaged beverage according to any one of the above-mentioned items <1-1> to <1-31>, wherein the protein as the component (A) preferably comprises a soybean protein.

<1-37>
The packaged beverage according to the above-mentioned item <1-36>, wherein the packaged beverage is preferably a packaged soymilk beverage.

<1-38>
The packaged beverage according to any one of the above-mentioned items <1-1> to <1-37>, preferably further comprising one or two or more of additives selected from the group consisting of acidulants, pH adjusters, flavors, vitamins, minerals, antioxidants, various esters, pigments, emulsifiers, preservatives, and quality stabilizers.

<1-39>
The packaged beverage according to any one of the above-mentioned items <1-1> to <1-38>, wherein the packaged beverage has a pH (25° C.) of preferably 6.4 or more, more preferably 6.5 or more, more preferably 6.6 or more, even more preferably 6.7 or more, and preferably 7.5 or less, more preferably 7 or less, even more preferably 6.9 or less.

<1-40>
The packaged beverage according to any one of the above-mentioned items <1-1> to <1-39>, wherein the packaged beverage has a pH (25° C.) of preferably from 6.3 to 7.5, more preferably from 6.4 to 7.5, more preferably from 6.5 to 7, more preferably from 6.6 to 7, even more preferably from 6.7 to 6.9.

<1-41>
The packaged beverage according to any one of the above-mentioned items <1-1> to <1-40>, wherein the container is preferably a molded container mainly formed of polyethylene terephthalate (so-called PET bottle), a metal can, a paper container composted with a metal foil or a plastic film, or a bottle.

<1-42>
The packaged beverage according to any one of the above-mentioned items <1-1> to <1-41>, wherein the heat sterilization is preferably one which complies with a condition specified by an applicable regulation (Food Sanitation Act in Japan), more preferably retort sterilization, high-temperature short-time sterilization (HTST), or ultrahigh-temperature sterilization (UHT).

<1-43>
The packaged beverage according to any one of the above-mentioned items <1-1> to <1-42>, wherein a variation ($\Delta d$), which is determined from a difference between the median diameter of colloidal particles in a beverage before heat sterilization and the median diameter of colloidal particles in a beverage after heat sterilization at 127° C. for 11 minutes, is preferably 3 µm or less, more preferably 2 µm or less, more preferably 1.5 µm or less, even more preferably 1.2 µm or less:

<1-44>
The packaged beverage according to any one of the above-mentioned items <1-1> to <1-43>, wherein a change ($\Delta E$) in color tone, which is determined from a difference between the L* value of a beverage before heat sterilization and the L* value of a beverage after heat sterilization at 127° C. for 11 minutes, is preferably 30 or less, more preferably 22 or less, more preferably 19 or less, even more preferably 18 or less.

<1-45>
The packaged beverage according to any one of the above-mentioned items <1-1> to <1-44>, wherein, when 50 g of the packaged beverage subjected to heat sterilization is centrifuged at 20° C. and 6,000 rpm for 10 minutes and then measured for the mass of a precipitate, the ratio of the precipitate to the beverage is preferably 5 mass % or less, more preferably 4.9 mass % or less, even more preferably 3.8 mass % or less.

<2-1>
A method of retaining a median diameter of colloidal particles in a packaged beverage subjected to heat sterilization,
the method comprising:
blending the following components (A) and (B):
(A) 2.5 mass % or more of a protein; and
(B) the non-polymer catechins; and
adjusting a mass ratio between the component (A) and the component (B), [(B)/(A)], to from 0.02 to 0.1, a viscosity to from 15 to 35 mPa·s, and a pH to 6.3 or more.

<2-2>
The method according to the above-mentioned item <2-1>, wherein the protein as the component (A) is preferably derived from an animal or a plant.

<2-3>
The method according to the above-mentioned item <2-1> or <2-2>, wherein the protein as the component (A) is preferably at least one selected from the group consisting of a milk protein, a soybean protein, a rice protein, a corn protein, a wheat protein, an egg protein, gelatin, and collagen, more preferably at least one selected from the group consisting of a milk protein and a soybean protein.

<2-4>
The method according to any one of the above-mentioned items <2-1> to <2-3>, wherein the protein as the component (A) comprises a casein protein and a whey protein.

<2-5>
The method according to any one of the above-mentioned items <2-1> to <2-4>, wherein the blending amount of the protein as the component (A) in the packaged beverage is preferably 2.5 mass % or more, more preferably 3 mass % or more, more preferably 3.5 mass % or more, more preferably 4 mass % or more, more preferably 4.5 mass or more, even more preferably 5 mass % or more, and is preferably 10 mass % or less, more preferably 9 mass % or less, more preferably 8 mass % or less, more preferably 7 mass % or less, even more preferably 6 mass % or less.

<2-6>

The method according to any one of the above-mentioned items <2-1> to <2-5>, wherein the blending amount of the protein as the component (A) in the packaged beverage is preferably from 2.5 to 10 mass %, more preferably from 3 to 10 mass %, more preferably from 3.5 to 9 mass %, more preferably from 4 to 8 mass %, more preferably from 4.5 to 7 mass %, even more preferably from 5 to 6 mass %.

<2-7>

The method according to any one of the above-mentioned items <2-1> to <2-6>, wherein the non-polymer catechins as the component (B) is preferably at least one selected from the group consisting of catechin, gallocatechin, catechin gallate, gallocatechin gallate, epicatechin, epigallocatechin, epicatechin gallate, and epigallocatechin gallate.

<2-8>

The method according to any one of the above-mentioned items <2-1> to <2-7>, wherein the mass ratio [(B)/(A)] is adjusted to preferably 0.025 or more, more preferably 0.03 or more, even more preferably 0.035 or more, and preferably 0.08 or less, more preferably 0.063 or less, even more preferably 0.06 or less.

<2-9>

The method according to any one of the above-mentioned items <2-1> to <2-8>, wherein the mass ratio [(B)/(A)] is adjusted to preferably from 0.025 to 0.08, more preferably from 0.03 to 0.063, even more preferably from 0.035 to 0.06.

<2-10>

The method according to any one of the above-mentioned items <2-1> to <2-9>, wherein the blending amount of the non-polymer catechins as the component (B) in the packaged beverage is preferably 0.1 mass % or more, more preferably 0.11 mass % or more, more preferably 0.12 mass % or more, more preferably 0.15 mass % or more, even more preferably 0.2 mass % or more, and is preferably 0.5 mass % or less, more preferably 0.45 mass % or less, more preferably 0.4 mass % or less, more preferably 0.35 mass % or less, more preferably 0.32 mass % or less, even more preferably 0.3 mass % or less.

<2-11>

The method according to any one of the above-mentioned items <2-1> to <2-10>, wherein the blending amount of the non-polymer catechins as the component (B) in the packaged beverage is preferably from 0.1 to 0.5 mass %, more preferably from 0.11 to 0.45 mass %, more preferably from 0.12 to 0.4 mass %, more preferably from 0.15 to 0.35 mass-et, even more preferably from 0.2 to 0.32 mass %.

<2-12>

The method according to any one of the above-mentioned items <2-1> to <2-11>, wherein the ratio of gallate forms in the non-polymer catechins as the component (B) is adjusted to preferably 10 mass % or more and less than 50 mass %, more preferably from 15 to 47 mass %, even more preferably from 20 to 45 mass %.

<2-13>

The method according to any one of the above-mentioned items <2-1> to <2-12>, preferably further blending a thickener as a component (C).

<2-14>

The method according to the above-mentioned item <2-13>, wherein the thickener as the component (C) is preferably one or two or more selected from the group consisting of components derived from algae, polysaccharides, and cellulose, more preferably one or two or more selected from the group consisting of alginic acid, agar, carrageenan, fucoidan, dextrin, maltodextrin, pectin, locust bean gum, xanthan gum, tragacanth gum, gellan gum, guar gum, carboxymethylcellulose, hydroxyethylcellulose, and salts thereof, more preferably one or two or more selected from the group consisting of carrageenan, xanthan gum, guar gum, dextrin, and maltodextrin, more preferably maltodextrin, even more preferably maltodextrin having a dextrose equivalent of from 3 to 20.

<2-15>

The method according to the above-mentioned item <2-13> or <2-14>, wherein the mass ratio of the thickener as the component (C) to the protein as the component (A), [(C)/(A)], is adjusted to preferably 0.01 or more, more preferably 0.04 or more, more preferably 1.3 or more, even more preferably 2 or more, and preferably 5 or less, more preferably 4 or less, even more preferably 3 or less.

<2-16>

The method according to any one of the above-mentioned items <2-13> to <2-15>, wherein the mass ratio of the thickener as the component (C) to the protein as the component (A), [(C)/(A)], adjusted to preferably from 0.01 to 5, more preferably from 0.04 to 4, more preferably from 1.3 to 4, even more preferably from 2 to 3.

<2-17>

The method according to any one of the above-mentioned items <2-13> to <2-16>, wherein the blending amount of the thickener as the component (C) in the packaged beverage is preferably 0.2 mass % or more, more preferably 1 mass % or more, more preferably 2 mass % or more, even more preferably 4 mass % or more, and is preferably 20 mass % or less, more preferably 14 mass % or less, more preferably 12 mass % or less, even more preferably 8 mass % or less.

<2-18>

The method according to any one of the above-mentioned items <2-13> to <2-17>, wherein the blending amount of the thickener as the component (C) in the packaged beverage is preferably from 0.2 to 20 mass %, more preferably from 1 to 14 mass %, more preferably from 2 to 12 mass %, even more preferably from 4 to 8 mass %.

<2-19>

The method according to any one of the above-mentioned items <2-1> to <2-18>, preferably further blending a sweetener as a component (D).

<2-20>

The method according to the above-mentioned item <2-19>, wherein the sweetener as the component (D) is preferably at least one selected from the group consisting of a carbohydrate sweetener and a high-intensity sweetener, more preferably a carbohydrate sweetener.

<2-21>

The method according to the above-mentioned item <2-19> or <2-20>, wherein the carbohydrate sweetener is preferably at least one selected from the group consisting of monosaccharides (for example, fructose, glucose, tagatose, and arabinose), disaccharides (for example, lactose, trehalose, maltose, and sucrose), high-fructose corn syrups (for example, glucofructose syrup and fructoglucose syrup), and sugar alcohols (for example, erythritol, xylitol, and maltitol), and the high-intensity sweetener preferably at least one selected from the group consisting of aspartame, sucralose, stevia, thaumatin, glycyrrhizin, saccharin, and acesulfame K.

<2-22>
The method according to the above-mentioned item <2-20> or <2-21>, wherein, when the sweetener as the component (D) is a carbohydrate sweetener, the blending amount of the carbohydrate sweetener in the packaged beverage is preferably from 0.01 to 15 mass %, more preferably from 0.05 to 12 mass %, even more preferably from 0.1 to 10 mass %, and when the sweetener as the component (D) is a high-intensity sweetener, the blending amount of the high-intensity sweetener in the packaged beverage is preferably from 0.0001 to 5 mass %, more preferably from 0.0001 to 3 mass %, even more preferably from 0.0001 to 1 mass %.

<2-23>
The method according to any one of the above-mentioned items <2-1> to <2-22>, wherein the mass ratio of caffeine as a component (E) to the non-polymer catechins as the component (B), [(E)/(B)], is adjusted to preferably 0.03 or more, more preferably 0.04 or more, even more preferably 0.045 or more, and preferably 0.3 or less, more preferably 0.08 or less, more preferably 0.075 or less, even more preferably 0.07 or less.

<2-24>
The method according to any one of the above-mentioned items <2-1> to <2-23>, wherein the mass ratio of caffeine as a component (E) to the non-polymer catechins as the component (B), [(E)/(B)], is adjusted to preferably from 0.03 to 0.3, more preferably from 0.03 to 0.08, even more preferably from 0.04 to 0.075, even more preferably from 0.045 to 0.07.

<2-25>
The method according to any one of the above-mentioned items <2-1> to <2-24>, wherein the blending amount of water in the packaged beverage is preferably 60 mass % or more, more preferably 65 mass % or more, even more preferably 70 mass % or more, and is preferably 95 mass % or less, more preferably 90 mass % or less, even more preferably 85 mass % or less.

<2-26>
The method according to any one of the above-mentioned items <2-1> to <2-25>, wherein the blending amount of water in the packaged beverage is preferably from 60 to 95 mass %, more preferably from 65 to 90 mass %, even more preferably from 70 to 85 mass %.

<2-27>
The method according to any one of the above-mentioned items <2-1> to <2-26>, wherein the viscosity (25° C.) is adjusted to preferably 16 mPa·s or more, more preferably 17 mPa·s or more, even more preferably 18 mPa·s or more, and preferably 33 mPa·s or less, more preferably 30 mPa·s or less, even more preferably 27 mPa·s or less.

<2-28>
The method according to any one of the above-mentioned items <2-1> to <2-27>, wherein the viscosity (25° C.) is adjusted to preferably from 16 to 33 mPa·s, more preferably from 17 to 30 mPa·s, even more preferably from 18 to 27 mPa·s.

<2-29>
The method according to any one of the above-mentioned items <2-1> to <2-28>, wherein the median diameter of colloidal particles in the packaged beverage is adjusted to preferably 0.5 μm or more, more preferably 0.8 μm or more, even more preferably 1.0 μm or more, and preferably 2.4 μm or less, more preferably 2.2 μm or less, even more preferably 2.0 μm or less.

<2-30>
The method according to any one of the above-mentioned items <2-1> to <2-29>, wherein the median diameter of colloidal particles in the packaged beverage is adjusted to preferably from 0.5 to 2.4 μm, more preferably from 0.8 to 2.2 μm, even more preferably from 1.0 to 2.0 μm.

<2-31>
The method according to any one of the above-mentioned items <2-1> to <2-30>, wherein the protein as the component (A) is preferably a milk protein.

<2-32>
The method according to the above-mentioned item <2-31>, wherein the milk protein comprises preferably 80 mass % or more, more preferably 83 mass % or more, more preferably 87 mass % or more, even more preferably 90 mass % or more, and preferably 100 mass % or less, more preferably 98 mass % or less, even more preferably 95 mass % or less of a casein protein as a component (F).

<2-33>
The method according to the above-mentioned item <2-31> or <2-32>, wherein the milk protein comprises preferably 80 to 100 mass %, more preferably 83 to 98 mass %, more preferably 87 to 98 mass %, even more preferably 90 to 95 mass % of a casein protein as a component (F).

<2-34>
The method according to any one of the above-mentioned items <2-31> to <2-33>, wherein the packaged beverage is preferably a packaged milk beverage.

<2-35>
The method according to any one of the above-mentioned items <2-1> to <2-30>, wherein the protein as the component (A) is preferably a soybean protein.

<2-36>
The method according to item <2-35>, wherein the packaged beverage is preferably a packaged soymilk beverage.

<2-37>
The method according to any one of the above-mentioned items <2-1> to <2-36>, wherein the pH (25° C.) is adjusted to preferably 6.4 or more, more preferably 6.5 or more, more preferably 6.6 or more, even more preferably 6.7 or more, and preferably 7.5 or less, more preferably 7 or less, even more preferably 6.9 or less.

<2-38>
The method according to any one of the above-mentioned items <2-1> to <2-37>, wherein the pH (25° C.) is adjusted to preferably from 6.3 to 7.5, more preferably from 6.4 to 7.5, more preferably from 6.5 to 7, more preferably from 6.6 to 7, even more preferably from 6.7 to 6.9.

<2-39>
The method according to any one of the above-mentioned items <2-1> to <2-38>, wherein the container is preferably a molded container mainly formed of polyethylene terephthalate (so-called PET bottle), a metal can, a paper container composited with a metal foil or a plastic film, or a bottle.

<2-40>
The method according to any one of the above-mentioned items <2-1> to <2-39>, wherein the heat sterilization is preferably one which complies with a condition specified by an applicable regulation (Food Sanitation Act in Japan), more preferably retort sterilization, high-temperature short-time sterilization (HTST), or ultrahigh-temperature sterilization (UHT)

<2-41>
The method according to any one of the above-mentioned items <2-2> to <2-40>, wherein a variation (Δd), which is determined from a difference between the median diameter of colloidal particles in a beverage before heat sterilization and the median diameter of colloidal particles in a beverage after heat sterilization at 127° C. for 11 minutes, is retained at preferably 3 μm or less, more preferably 2 μm or less, more preferably 1.5 μm or less, even more preferably 1.2 μm or less.

<2-42>

The method according to any one of the above-mentioned items <2-1> to <2-41>, wherein a change (ΔE) in color tone, which is determined from a difference between the L* value of a beverage before heat sterilization and the L* value of a beverage after heat sterilization at 127° C. for 11 minutes, is controlled to preferably 30 or less, more preferably 22 or less, more preferably 19 or less, even more preferably 18 or less.

<2-43>

The method according to any one of the above-mentioned items <2-1> to <2-42>, wherein, when 50 g of the packaged beverage subjected to heat sterilization is centrifuged at 20° C. and 6,000 rpm for 10 minutes and then measured for the mass of a precipitate, the ratio of the precipitate to the beverage is controlled to preferably 5 mass % or less, more preferably 4.5 mass % or less, even more preferably 4 mass % or less.

EXAMPLES

1. Quantification of Non-polymer Catechins and Caffeine
1) Preparation of Reagents
   Reagent 1: 0.1 N aqueous solution of HCl containing 40 mg/mL pepsin
   Reagent 2: 2 mass % aqueous solution of acetic acid
2) Preparation of Sample 6 mL of a reagent 1 was added to 2 mL of a sample, and the resultant was mixed at 37° C. for 15 minutes. Subsequently, 8 mL of a reagent 2 was added thereto, and the resultant was centrifuged at 14,000 rpm for 5 minutes to yield a supernatant. The supernatant was filtered through a 0.45-μm PTFE filter, and the filtrate was analyzed by a gradient method using a high-performance liquid chromatograph (model SCL-10AVP, manufactured by Shimadzu Corporation) equipped with an octadecyl group-introduced packed column for liquid chromatography L-column TM ODS (4.6 mmϕ×250 mm: manufactured by Chemicals Evaluation and Research Institute, Japan) at a column temperature of 35° C. Determination was carried out under conditions of using a solution of 0.1 mol/L acetic acid in distilled water as a mobile phase solution A and a solution of 0.1 mol/L acetic acid in acetonitrile as a mobile phase solution B at a sample injection volume of 20 μL and a UV detector wavelength of 280 nm. It should be noted that catechin (manufactured by Wako Pure Chemical Industries, Ltd.) was used as a standard.

| Time | Concentration Gradient Condition (vol %) | |
|---|---|---|
| | Mobile phase A | Mobile phase B |
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |
| 49 min | 97% | 3% |
| 62 min | 97% | 3% |

2. Quantification of Protein
1) Preparation of Reagents
   Reagent 1: 0.1 M aqueous solution of NaOH containing 2 mass % of $Na_2CO_3$
   Reagent 2: 1 mass % aqueous solution of sodium citrate containing 0.5 mass % of $CuSO_4 \cdot 5H_2O$
   Reagent 3: 1 N phenol reagent
   Reagent 4: solution obtained by mixing the reagent 1 and the reagent 2 at 50:1 (mass ratio)
2) Quantification The protein was quantified by a Lowry method. Specifically, the quantification was carried out as described below. 400 μL of a reagent 4 was added to 20 μL of a sample, and the mixture was left to stand for 15 minutes at 25° C. 40 μL of a reagent 3 was added to the resultant solution, and the mixture was left to stand for 30 minutes at 25° C. After that, an absorbance at 750 nm was measured using a spectrophotometer. A standard solution was prepared using bovine serum albumin (BSA, manufactured by Nordic-MUbio BV) as a standard by the following procedure. That is, an aqueous solution of 1 mg/mL BSA was prepared, and 100 μL of a reagent 4 was added to 20 μL of the resultant solution. Then, 100 μL of the reagent 4 was added to 20 μL of the resultant solution, and the mixture was left to stand still at 25° C. for 10 minutes. Subsequently, 10 μL of the reagent 3 was added, and the mixture was left to stand for 30 minutes. After that, an absorbance at 750 nm was measured using the spectrophotometer. Based on a standard line drawn for the standard, the protein concentration was determined.

3. Quantification of Casein Protein
1) Preparation of Sample 9 mL of a sample extract solution (Morinaga FASPEK milk measurement kit (casein), manufactured by Morinaga Institute of Biological Science, Inc.) was added to 1 g of a sample, and the resultant was mixed and shaken using a shaking machine for 12 hours (90 reciprocating strokes/min., room temperature, shaking width: 3 cm), and centrifuged at 3,000 g for 20 minutes (at room temperature) to separate the supernatant, followed by dilution with a sample diluent (milk measurement kit) 20-fold. Thus, a solution for measurement was obtained.

2) Measurement Method

100 μL of a casein protein standard solution (manufactured by Nippon Gene Co., Ltd.) and 100 μL of the solution for measurement were added to an antibody-immobilized plate, and the plate was covered and left to stand still at room temperature for 1 hour. Then, the solution in each well was removed, and each well was washed six times with 250 mL of a washing solution (milk measurement kit). Subsequently, 100 μL of an enzyme-labeled anti-casein antibody solution (milk measurement kit) was dispensed into each well, and the plate was covered and left to stand still at room temperature for 30 minutes. The solution in each well was removed, and each well was washed six times with 250 mL of the washing solution. Subsequently, 100 μL of an enzyme substrate solution (milk measurement kit) was dispensed into each well. The plate was covered and left to stand still at room temperature for 10 minutes under a light shielding condition, and 100 μL of a reaction stop solution (milk measurement kit) was dispensed into each well to stop the enzymatic reaction, followed by measurement of an absorbance in each well using a plate reader at a main wavelength of 450 nm and a sub wavelength of from 600 to 650 nm. A standard curve was prepared based on absorbances for the standard solution to determine the concentration of a casein protein in the sample.

4. Quantification of Dextrin
1) Preparation of Reagents
   Reagent 1: 0.1 N aqueous solution of HCl containing 40 mg/mL pepsin
   Reagent 2: 2 mass % aqueous solution of acetic acid
2) Preparation of Sample
   6 mL of a reagent 1 was added to 2 mL of a sample, and the resultant was mixed at 37° C. for 15 minutes. Subsequently, 8 mL of a reagent 2 was added thereto, and the resultant was centrifuged at 14,000 rpm for 5 minutes to yield a supernatant. The supernatant was filtered through a 0.45-μm PTFE filter, and the filtrate was analyzed with a high-performance liquid chromatograph. It should be noted that Dextrin (manufactured by MP Biomedicals) was used as a standard.
3) Analysis Condition
   Column: Shodex Asahipak GS-220 HQ (7.5 mmID×300 mm)×2
   Eluent: $H_2O$
   Flow rate: 0.6 mL/min
   Detector: Shodex RI
   Column temp.: 60° C.
   Injection volume: 10 μL
5. Measurement of Viscosity
1) Measurement Condition
   Apparatus: viscometer (manufactured by BROOKFIELD ENGINEERING LABS. INC.) MODEL PVDV-It
   Spindle: 2
2) Measurement Method
   50 mL of a sample kept at a temperature of 25° C. was poured into a measurement cup to immerse spindle 2 into the sample, and a value determined under conditions of 60 rpm and 1.5 minutes was defined as a viscosity (mPa·s).
6. Measurement of Median Diameter
1) Measurement Condition
   Apparatus: LASER DIFFRACTION PARTICLE SIZE ANALYZER (manufactured by SHIMADZU) MODEL SALD-2100
2) Measurement Method
   An appropriate amount of a sample was added to a chamber, and the particle size distribution was measured to determine a median diameter.
7. Measurement of Amount of Precipitate
   50 g of a beverage was centrifuged at 20° C. and 6,000 rpm for 10 minutes, and the supernatant was removed. Then, the mass of the precipitate was measured, and the ratio (mass %) of the precipitate to the beverage was determined.
8. Measurement of Color Tone
   The L* values in the L*a*b* color system of a beverage before and after heat sterilization were measured at 25° C. using a spectrocolorimeter (SE-2000, manufactured by Nippon Denshoku Industries Co., Ltd.). Then, a change (ΔE) in color tone was calculated from a difference between the L* value of a beverage before heat sterilization and the L* value of a beverage after heat sterilization.
9. Sensory Evaluation
   The packaged beverages obtained in Examples and Comparative Examples were evaluated on texture smoothness and a sensation in throat by ten expert panelists in accordance with the following criteria. After that, scores were determined through discussion.
   1) Texture Smoothness
   5: Very smooth texture
   4: Smooth texture
   3: Usual texture
   2: Less smooth texture
   1: Very less smooth texture
   2) Sensation in Throat (Sensation of Sticking in Throat)
   5: No sensation of sticking in throat
   4: Few sensation of sticking in throat
   3: Usual sensation of sticking in throat
   2: Slight sensation of sticking in throat
   1: Sensation of sticking in throat Production Example 1

Production of Green Tea Extract A 1,000 g of a commercially available concentrated green tea extract ("POLYPHENON HG" manufactured by Mitsui Norin Co., Ltd.) was suspended in 9,000 g of an aqueous solution of 95 mass % ethanol at normal temperature under a stirring condition of 200 r/min, and 200 g of activated carbon (KURARAY COAL GLC, manufactured by Kuraray Co., Ltd.) and 500 g of acid clay (MIZUKA ACE #600, manufactured by Mizusawa Industrial Chemicals, Ltd.) were added thereto, followed by stirring for about 30 minutes. Subsequently, the activated carbon, acid clay, and precipitates were separated by filtration using #2 filter paper, followed by filtration again using a 0.2-μm membrane filter. Finally, 200 g of ion-exchange water was added to the filtrate, and ethanol was distilled off at 40° C. and 3.3 kPa to perform concentration under reduced pressure. The amount of the resultant product concentrated under reduced pressure was 800 g. 750 g of the resultant product was added to a stainless-steel container, and the total amount was adjusted to 10,000 g with ion-exchange water, followed by addition of 30 g of an aqueous solution of 5 mass % sodium bicarbonate to adjust the pH to 5.5. Subsequently, a solution obtained by dissolving 2.7 g of TANNASE KTFH (manufactured by Kikkoman Corporation, Industrial Grade, 500 U/g or more) in 10.7 g of ion-exchange water was added thereto at 22° C. under a stirring condition of 150 r/min, and the enzymatic reaction was completed 30 minutes later when the pH was decreased to 4.24. Subsequently, the stainless-steel container was immersed into a hot water bath at 95° C. and retained at 90° C. for 10 minutes to completely deactivate the enzymatic activity. Subsequently, the resultant was cooled to 25° C. and subjected to concentration treatment. Thus, a green tea extract A was obtained. In the resultant green tea extract A, the content of the non-polymer catechins was 15.7 mass %, and the ratio of gallate forms in the non-polymer catechins was 40.2 mass %.

Example 1

The components except for the green tea extract A and flavor shown in Table 1, and water at 25° C. were blended and stirred using a paddle mixer to preliminarily dissolve the components. The blended components were heated to 65° C. and mixed to dissolve the components for 10 minutes. After confirming dissolution of the blended components, the resultant was cooled to 30° C., and the green tea extract A and the flavor were added to the cooled mixture. A sodium bicarbonate solution was added thereto to adjust the pH to a predetermined value, and water was added so as to achieve a prescribed preparation amount. Thus, a preparation solution was obtained. The preparation solution was heated to 75° C., and 190 g of the solution was filled into a metal can having a capacity of 200 g. The head space was purged with nitrogen, and the lid of the can was screwed, followed by retort sterilization at 127° C. for 11 minutes. Thus, a packaged beverage was obtained.

Examples 2 to 17 and Comparative Examples 1 to 8

Packaged beverages subjected to heat sterilization were obtained in the same manner as in Example 1 except that the components shown in Table 1 were blended at the ratios shown in Table 1. The analysis results and results of the sensory evaluations for the resultant packaged beverages are shown in Table 1.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Formulation | Granulated sugar | 9.7 | 9.7 | 9.7 | 9.7 | 9.7 | 9.7 | 9.7 | 9.7 | 9.7 |
| | Maltodextrin[*1] | 7.2 | 7.2 | 7.2 | 7.2 | 7.2 | 7.2 | 7.2 | 7.2 | 7.2 |
| | Milk protein[*2] | 6.8 | 6.8 | 6.8 | 6.8 | 6.8 | 6.8 | 6.8 | 6.8 | 6.8 |
| | Soybean protein[*3] | — | — | — | — | — | — | — | — | — |
| | Green tea extract A | 1.00 | 1.35 | 1.55 | 2.10 | 2.35 | 2.85 | 3.10 | 3.10 | 4.20 |
| | Flavor | 0.4 | 0.4 | 0.4 | 0.4 | 0.4 | 0.4 | 0.4 | 0.4 | 0.4 |
| | Sodium bicarbonate | Appropriate amount[*4] | Appropriate amount[*4] | Appropriate amount[*4] | Appropriate amount[*4] | Appropriate amount[*4] | Appropriate amount[*4] | Appropriate amount[*4] | Appropriate amount[*4] | Appropriate amount[*4] |
| | Citric acid | — | — | — | — | — | — | — | — | — |
| | Water | Balance | Balance | Balance | Balance | Balance | Balance | Balance | Balance | Balance |
| | Total | 100 | 100 | 100 | 100 | 100 | 100 | 100 | 100 | 100 |
| Analysis values (after sterilization) | (B) Non-polymer catechins (mass %) | 0.11 | 0.11 | 0.15 | 0.23 | 0.23 | 0.23 | 0.31 | 0.34 | 0.34 |
| | (A) Protein (mass %) | 5.5 | 5.5 | 5.5 | 5.5 | 5.5 | 5.5 | 5.5 | 5.5 | 5.5 |
| | (F) Casein protein (mass %) | 5.1 | 5.1 | 5.1 | 5.1 | 5.1 | 5.1 | 5.1 | 5.1 | 5.1 |
| | (B) Non-polymer catechins/(A) Protein | 0.020 | 0.020 | 0.028 | 0.042 | 0.042 | 0.042 | 0.056 | 0.062 | 0.062 |
| | (C) Thickener/(A) Protein | 1.31 | 1.31 | 1.31 | 1.31 | 1.31 | 1.31 | 1.31 | 1.31 | 1.31 |
| | (E) Caffeine/(B) Non-polymer catechins | 0.041 | 0.056 | 0.046 | 0.041 | 0.046 | 0.056 | 0.046 | 0.041 | 0.056 |
| | Water content (mass %) | 77.22 | 77.22 | 77.22 | 77.22 | 77.22 | 77.22 | 77.22 | 77.22 | 77.22 |
| | pH (25° C.) | 6.6 | 7.0 | 6.8 | 6.7 | 6.8 | 6.9 | 6.8 | 6.6 | 7.0 |
| | Viscosity (25° C., mPa·s) | 19.6 | 19.6 | 19.4 | 19.2 | 19.2 | 19.2 | 19.0 | 18.6 | 18.6 |
| | Amount of precipitate (mass %) | 4.9 | 3.3 | 3.5 | 2.1 | 2.0 | 2.0 | 2.5 | 4.5 | 3.0 |
| | Color tone (L* value) | 63.7 | 61.9 | 62.7 | 64.6 | 64.2 | 64.8 | 62.9 | 64.0 | 62.9 |
| | Color tone (ΔE/change between before and after sterilization) | 16.7 | 19.9 | 17.7 | 16.9 | 18.0 | 19.7 | 17.9 | 18.9 | 19.9 |
| | Median diameter of colloidal particles (μm) | 2.2 | 2.0 | 2.1 | 1.5 | 1.4 | 1.3 | 1.9 | 1.9 | 1.9 |
| | Variation (Δd, μm) in median diameter between before and after sterilization | 1.2 | 1.0 | 1.1 | 0.5 | 0.4 | 0.3 | 0.9 | 0.9 | 0.9 |
| Evaluation | Texture smoothness | 4 | 5 | 5 | 5 | 5 | 5 | 5 | 4 | 5 |
| | Sensation in throat | 4 | 4 | 4 | 5 | 5 | 5 | 5 | 4 | 4 |

TABLE 1-continued

| | | Example | | | | | | | |
|---|---|---|---|---|---|---|---|---|---|
| | | 10 | 11 | 12 | 13 | 14 | 15 | 16 | 17 |
| Formulation | Granulated sugar | 9.7 | 9.7 | 9.7 | 9.7 | 9.7 | 9.7 | 9.7 | 9.7 |
| | Maltodextrin[*1] | 10.0 | 3.0 | 7.2 | 7.2 | 7.2 | 7.2 | 7.2 | 7.2 |
| | Milk protein[*2] | 6.8 | 6.8 | 3.3 | 10.0 | — | 6.8 | 6.8 | 6.8 |
| | Soybean protein[*3] | — | — | — | — | 6.8 | — | — | — |
| | Green tea extract A | 2.35 | 2.35 | 1.00 | 4.20 | 2.35 | 4.40 | 5.50 | 4.50 |
| | Flavor | 0.4 | 0.4 | 0.4 | 0.4 | 0.4 | 0.4 | 0.4 | 0.4 |
| | Sodium bicarbonate | Appropriate amount[*4] | Appropriate amount[*4] | Appropriate amount[*4] | Appropriate amount[*4] | Appropriate amount[*4] | Appropriate amount[*4] | Appropriate amount[*4] | Appropriate amount[*4] |
| | Citric acid | — | — | — | — | — | — | — | — |
| | Water | Balance | Balance | Balance | Balance | Balance | Balance | Balance | Balance |
| | Total | 100 | 100 | 100 | 100 | 100 | 100 | 100 | 100 |
| Analysis values (after sterilization) | (B) Non-polymer catechins (mass %) | 0.23 | 0.23 | 0.11 | 0.34 | 0.23 | 0.36 | 0.55 | 0.31 |
| | (A) Protein (mass %) | 5.5 | 5.5 | 2.7 | 8.1 | 5.9 | 5.5 | 5.5 | 5.5 |
| | (F) Casein protein (mass %) | 5.1 | 5.1 | 2.5 | 7.5 | — | 5.1 | 5.1 | 5.1 |
| | (B) Non-polymer catechins/(A) Protein | 0.042 | 0.042 | 0.041 | 0.042 | 0.039 | 0.065 | 0.100 | 0.056 |
| | (C) Thickener/(A) Protein | 1.82 | 0.55 | 2.67 | 0.89 | 1.22 | 1.31 | 1.31 | 1.31 |
| | (E) Caffeine/(B) Non-polymer catechins | 0.046 | 0.046 | 0.041 | 0.056 | 0.046 | 0.056 | 0.032 | 0.047 |
| | Water content (mass %) | 74.42 | 81.42 | 80.25 | 74.45 | 76.90 | 77.22 | 77.40 | 77.20 |
| | pH (25° C.) | 6.8 | 6.8 | 6.8 | 7.0 | 7.0 | 7.0 | 6.8 | 7.3 |
| | Viscosity (25° C., mPa·s) | 22.0 | 22.0 | 15.3 | 22.0 | 32.0 | 18.6 | 18.0 | 18.0 |
| | Amount of precipitate (mass %) | 1.0 | 1.0 | 1.0 | 4.0 | 1.8 | 5.0 | 3.7 | 2.5 |
| | Color tone (L* value) | 63.3 | 64.3 | 64.0 | 61.7 | 44.7 | 53.9 | 61.3 | 63.0 |
| | Color tone (ΔE/change between before and after sterilization) | 18.1 | 15.4 | 18.2 | 20.0 | 10.2 | 23.6 | 20.4 | 21.4 |
| | Median diameter of colloidal particles (μm) | 2.0 | 1.6 | 1.3 | 1.2 | 1.4 | 2.7 | 1.9 | 1.8 |
| | Variation (Δd, μm) in median diameter between before and after sterilization | 1.5 | 0.4 | 1.0 | 0.9 | 0.2 | 1.2 | 0.9 | 0.8 |
| Evaluation | Texture smoothness | 5 | 4 | 5 | 4 | 4 | 3 | 4 | 4 |
| | Sensation in throat | 4 | 5 | 5 | 4 | 4 | 3 | 5 | 4 |

| | | Comparative Example | | | | | | | |
|---|---|---|---|---|---|---|---|---|---|
| | | 1 | 2 | 3 | 4 | 5 | 6 | 7 | 8 |
| Formulation | Granulated sugar | 9.7 | 9.7 | 9.7 | 9.7 | 9.7 | 9.7 | 9.7 | 9.7 |
| | Maltodextrin[*1] | 7.2 | 7.2 | — | 7.2 | 7.2 | 15.0 | 7.2 | 7.2 |
| | Milk protein[*2] | 6.8 | 6.8 | 6.8 | 6.8 | 6.8 | 6.8 | 6.8 | 6.8 |
| | Soybean protein[*3] | — | — | — | — | — | — | — | — |
| | Green tea extract A | — | — | 2.35 | 0.90 | 1.25 | 2.35 | 1.94 | 6.60 |
| | Flavor | 0.4 | 0.4 | 0.4 | 0.4 | 0.4 | 0.4 | 0.4 | 0.4 |
| | Sodium bicarbonate | Appropriate amount[*4] | Appropriate amount[*4] | Appropriate amount[*4] | Appropriate amount[*4] | Appropriate amount[*4] | Appropriate amount[*4] | — | Appropriate amount[*4] |

TABLE 1-continued

|  |  | | | | | | | | |
|---|---|---|---|---|---|---|---|---|---|
|  | Citric acid | — | — | — | — | — | — | Appropriate amount*4 | — |
|  | Water | Balance | Balance | Balance | Balance | Balance | Balance | Balance | Balance |
|  | Total | 100 | 100 | 100 | 100 | 100 | 100 | 100 | 100 |
| Analysis values (after sterilization) | (B) Non-polymer catechins (mass %) | — | — | 0.23 | 0.10 | 0.10 | 0.23 | 0.23 | 0.66 |
|  | (A) Protein (mass %) | 5.5 | 5.5 | 5.5 | 5.5 | 5.5 | 5.5 | 5.5 | 5.5 |
|  | (F) Casein protein (mass %) | 5.1 | 5.1 | 5.1 | 5.1 | 5.1 | 5.1 | 5.1 | 5.1 |
|  | (B) Non-polymer catechins/(A) Protein | — | — | 0.042 | 0.018 | 0.018 | 0.042 | 0.042 | 0.120 |
|  | (C) Thickener/(A) Protein | 1.31 | 1.31 | — | 1.31 | 1.31 | 2.73 | 1.31 | 1.31 |
|  | (E) Caffeine/(B) Non-polymer catechins | — | — | 0.046 | 0.041 | 0.056 | 0.046 | 0.038 | 0.032 |
|  | Water content (mass %) | 77.22 | 77.22 | 84.20 | 77.22 | 77.22 | 69.42 | 77.22 | 75.90 |
|  | pH (25° C.) | 6.6 | 7.0 | 6.8 | 6.6 | 7.0 | 6.8 | 3.9 | 6.8 |
|  | Viscosity (25° C., mPa · s) | 22.4 | 22.4 | 11.2 | 20.4 | 20.5 | 44.7 | 45.3 | 21.2 |
|  | Amount of precipitate (mass %) | 8.2 | 7.8 | 1.6 | 5.2 | 5.0 | 1.4 | 20.8 | 5.2 |
|  | Color tone (L* value) | 57.6 | 55.8 | 41.2 | 60.7 | 58.3 | 58.8 | 82.9 | 63.5 |
|  | Color tone (ΔE/change between before and after sterilization) | 20.6 | 20.9 | 25.7 | 20.1 | 20.4 | 21.4 | 17.3 | 19.8 |
|  | Median diameter of colloidal particles (μm) | 3.9 | 3.7 | 2.4 | 2.6 | 2.5 | 6.2 | 124.1 | 2.4 |
|  | Variation (Δd, μm) in median diameter between before and after sterilization | 3.2 | 3.0 | 1.9 | 1.8 | 1.7 | 5.2 | 110.6 | 1.8 |
| Evaluation | Texture smoothness | 1 | 2 | 2 | 2 | 3 | 2 | 1 | 3 |
|  | Sensation in throat | 1 | 1 | 1 | 2 | 2 | 1 | 1 | 2 |

*1 Dextrose equivalent; 3 to 20
*2 Milk Protein Concentrate (manufactured by Ingredia)
*3 Harmony B200 (manufactured by Nippon Shinyaku Co., Ltd.)
*4 Amount to achieve a predetermined pH Examples 18 to 21

Packaged beverages subjected to heat sterilization were obtained in the same manner as in Example 1 except that the components shown in Table 2 were blended at the ratios shown in Table 2. The analysis results and results of the sensory evaluations for the resultant packaged beverages are shown in Table 2 together with the results of Example 7.

TABLE 2

|  |  | Example | | | | |
|---|---|---|---|---|---|---|
|  |  | 7 | 18 | 19 | 20 | 21 |
| Formulation | Granulated sugar | 9.7 | 9.7 | 9.7 | 9.7 | 9.7 |
|  | Maltodextrin*1 | 7.2 | — | — | — | 7.2 |
|  | Carrageenan*5 | — | 2.0 | — | — | — |
|  | Xanthan gum*6 | — | — | 0.25 | — | — |
|  | Guar gum*7 | — | — | — | 1.0 | — |
|  | Milk protein*2 | 6.8 | 6.8 | 6.8 | 6.8 | 6.8 |
|  | Soybean protein*3 | — | — | — | — | — |
|  | Green tea extract A | 3.10 | 3.10 | 3.10 | 3.10 | — |
|  | Green tea extract B*8 | — | — | — | — | 1.49 |
|  | Flavor | 0.4 | 0.4 | 0.4 | 0.4 | 0.4 |

TABLE 2-continued

| | | Example | | | | |
|---|---|---|---|---|---|---|
| | | 7 | 18 | 19 | 20 | 21 |
| | Sodium bicarbonate | Appropriate amount*4 | Appropriate amount*4 | Appropriate amount*4 | Appropriate amount*4 | Appropriate amount*4 |
| | Citric acid | — | — | — | — | — |
| | Water | Balance | Balance | Balance | Balance | Balance |
| | Total | 100 | 100 | 100 | 100 | 100 |
| Analysis values (after sterilization) | (B) Non-polymer catechins (mass %) | 0.31 | 0.31 | 0.31 | 0.31 | 0.31 |
| | (A) Protein (mass %) | 5.5 | 5.5 | 5.5 | 5.5 | 5.5 |
| | (F) Casein protein (mass %) | 5.1 | 5.1 | 5.1 | 5.1 | 5.1 |
| | (B) Non-polymer catechins/(A) Protein | 0.056 | 0.056 | 0.056 | 0.056 | 0.056 |
| | (C) Thickener/(A) Protein | 1.31 | 0.36 | 0.04 | 0.18 | 1.31 |
| | (E) Caffeine/(B) Non-polymer catechins | 0.046 | 0.046 | 0.046 | 0.046 | 0.284 |
| | Water content (mass %) | 77.22 | 82.40 | 84.17 | 83.42 | 76.20 |
| | pH (25° C.) | 6.8 | 6.8 | 6.8 | 6.8 | 6.8 |
| | Viscosity (25° C., mPa·s) | 19.0 | 19.0 | 19.0 | 19.0 | 18.6 |
| | Amount of precipitate (mass %) | 2.5 | 3.4 | 2.0 | 2.1 | 2.6 |
| | Color tone (L* value) | 62.9 | 61.9 | 63.4 | 63.6 | 62.7 |
| | Color tone (ΔE/change between before and after sterilization) | 17.9 | 19.6 | 18.2 | 18.4 | 17.7 |
| | Median diameter of colloidal particles (μm) | 1.9 | 2.0 | 1.8 | 1.8 | 1.9 |
| | Variation (Δd, μm) in median diameter between before and after sterilization | 0.9 | 1.3 | 1.0 | 1.1 | 0.9 |
| Evaluation | Texture smoothness | 5 | 5 | 5 | 5 | 5 |
| | Sensation in throat | 5 | 4 | 4 | 4 | 5 |

*[1] Dextrose equivalent; 3 to 20
*[2] Milk Protein Concentrate (manufactured by Ingredia)
*[3] Harmony B200 (manufactured by Nippon Shinyaku Co., Ltd.)
*[4] Amount to achieve a predetermined pH
*[5] CARRAGEENIN CSL-2(F) (manufactured by San-Ei Gen F.F.I., Inc.)
*[6] SAN ACE NXG-S (manufactured by San-Ei Gen F.F.I., Inc.)
*[7] Bistop D-2029 (manufactured by San-Ei Gen F.F.I., Inc.)
*[8] POLYPHENON G (manufactured by Mitsui Norin Co., Ltd., non-polymer catechins: 32.2 mass %)

It found from Table 1 and Table 2 that a packaged beverage subjected to heat sterilization having a smooth texture and a good sensation in throat was obtained by blending the non-polymer catechins as the component (B) in a high concentration of the protein as the component (A) at a predetermined quantitative ratio and controlling the viscosity and pH to fall within specific ranges.

The invention claimed is:

1. A packaged beverage, comprising components (A) and (B):
   (A) 2.5 mass % or more, based on the mass of the beverage, of a protein;
   (B) a non-polymer catechin; and
   (C) a thickener,
   the packaged beverage having:
   a mass ratio between component (A) and component (B), [(B)/(A)], of from 0.02 to 0.1;
   a viscosity of from 15 to 35 mPa·s; and
   a pH of 6.3 or more,
   wherein said thickener is selected from the group consisting of alginic acid, agar, carrageenan, fucoidan, dextrin, maltodextrin, pectin, locust bean gum, xanthan gum, gum tragacanth, gellan gum, guar gum, carboxymethylcellulose, and hydroxyethylcellulose, or a salt thereof.

2. The packaged beverage according to claim 1, wherein a content of the non-polymer catechin as component (B) is from 0.1 to 0.5 mass %, based on the mass of the beverage.

3. The packaged beverage according to claim 1, wherein a content of the protein as the component (A) is from 3 to 10 mass %, based on the mass of the beverage.

4. The packaged beverage according to claim 1, wherein the packaged beverage has a pH of from 6.3 to 7.5.

5. The packaged beverage according to claim 1, wherein the protein of component (A) comprises casein protein as a component (F), and
   wherein a ratio of the casein protein as a component (F) in the protein of component (A) is from 80 to 100 mass %.

6. The packaged beverage according to claim 1, wherein a ratio of gallate forms in the non-polymer catechins as the component (B) is from 10 mass % to 50 mass %.

7. The packaged beverage according to claim 1, wherein a mass ratio of the thickener as the component (C) to the protein as the component (A), [(C)/(A)], is from 0.01 to 5.

8. The packaged beverage according to claim 1, wherein a content of the thickener as the component (C) in the packaged beverage is from 0.2 to 20 mass %.

9. The packaged beverage according to claim 1, further comprising a sweetener as a component (D).

10. The packaged beverage according to claim 9, wherein the sweetener is at least one member selected from the group consisting of a carbohydrate sweetener and a high-intensity sweetener.

11. The packaged beverage according to claim 10, wherein
   the sweetener as the component (D) is a carbohydrate sweetener, and a content of the carbohydrate sweetener in the packaged beverage is from 0.01 to 15 mass %.

12. The packaged beverage according to claim 10, wherein
   the sweetener as the component (D) is a high-intensity sweetener, and a content of the high-intensity sweetener in the packaged beverage is from 0.0001 to 5 mass %.

13. The packaged beverage according to claim 1, further comprising caffeine as a component (E).

14. The packaged beverage according to claim 13, wherein a content of the caffeine as the component (E), in terms of a mass ratio of the caffeine as the component (E) to the non-polymer catechins as the component (B), [(E)/(B)], is from 0.03 to 0.3.

15. The packaged beverage according to claim 1, wherein a content of water present in the packaged beverage is from 60 to 95 mass %.

16. The packaged beverage according to claim 1, wherein a median diameter of colloidal particles in the packaged beverage is 0.5 to 2.4 μm.

17. The packaged beverage according to claim 1, wherein a variation (Δd), which is determined from a difference between the median diameter of colloidal particles in a beverage before heat sterilization and the median diameter of colloidal particles in a beverage after heat sterilization at 127° C. for 11 minutes, is 3 μm or less.

18. The packaged beverage according to claim 1, wherein a change (ΔE) in color tone, which is determined from a difference between the L* value of a beverage before heat sterilization and the L* value of a beverage after heat sterilization at 127° C. for 11 minutes, is 30 or less.

19. The packaged beverage according to claim 1, wherein the packaged beverage is subjected to heat sterilization.

20. The packaged beverage according to claim 1, wherein, when 50 g of the packaged beverage subjected to heat sterilization is centrifuged at 20° C. and 6,000 rpm for 10 minutes and then measured for a mass of a precipitate, a ratio of the precipitate to the beverage is 5 mass % or less.

* * * * *